United States Patent
Park

(10) Patent No.: US 9,252,416 B2
(45) Date of Patent: Feb. 2, 2016

(54) SAFETY APPARATUS OF BATTERY MODULE FOR VEHICLE

(71) Applicant: Hyundai Motor Company, Seoul (KR)

(72) Inventor: Sang Mok Park, Gyeonggi-do (KR)

(73) Assignee: Hyundai Motor Company, Seoul (KR)

(*) Notice: Subject to any disclaimer, the term of this patent is extended or adjusted under 35 U.S.C. 154(b) by 381 days.

(21) Appl. No.: 13/859,176

(22) Filed: Apr. 9, 2013

(65) Prior Publication Data

US 2014/0186664 A1 Jul. 3, 2014

(30) Foreign Application Priority Data

Dec. 27, 2012 (KR) ........................ 10-2012-0154747

(51) Int. Cl.
*H01M 2/20* (2006.01)
*B60L 11/18* (2006.01)
*H01M 2/34* (2006.01)

(52) U.S. Cl.
CPC ............... *H01M 2/206* (2013.01); *B60L 11/18* (2013.01); *H01M 2/345* (2013.01)

(58) Field of Classification Search
CPC ..... H01M 2/202; H01M 2/206; H01M 2/266; H01M 2/34; H01M 2/345; H01M 2200/20
See application file for complete search history.

(56) References Cited

U.S. PATENT DOCUMENTS

| 2011/0123848 A1* | 5/2011 | Han | 429/121 |
| 2011/0151305 A1* | 6/2011 | Bolze et al. | 429/120 |
| 2013/0052514 A1* | 2/2013 | Kim | 429/159 |

FOREIGN PATENT DOCUMENTS

| JP | 2012-109152 A | 6/2012 |
| KR | 10-1998-039416 | 8/1998 |
| KR | 10-0585380 B1 | 5/2006 |
| KR | 10-2006-0090469 A | 8/2006 |
| KR | 10-2006-0116424 A | 11/2006 |
| KR | 10-2009-0043717 A | 5/2009 |
| KR | 10-2010-0135601 A | 12/2010 |
| KR | 10-2012-0081402 A | 7/2012 |

\* cited by examiner

*Primary Examiner* — Raymond Alejandro
(74) *Attorney, Agent, or Firm* — Mintz Levin Cohn Ferris Glovsky and Popeo, P.C.; Peter F. Corless

(57) ABSTRACT

A safety apparatus of a battery module for a vehicle is provided. The apparatus includes cell terminals disposed in battery cells disposed in a row. A safety bus bar electrically connects two cell terminals disposed diagonally in two battery cells adjacent to each other among the battery cells. In addition, the safety bus bar maintains the electrical connection when the battery cells are not expanded and opens a circuit to prevent electricity from flowing when at least one battery cell is expanded.

10 Claims, 3 Drawing Sheets

SAFETY APPARATUS OF BATTERY MODULE FOR VEHICLE

CROSS-REFERENCE TO RELATED APPLICATION

This application claims under 35 U.S.C. §119(a) the benefit of Korean Patent Application No. 10-2012-0154747 filed Dec. 27, 2012, the entire contents of which are incorporated herein by reference.

BACKGROUND (a) Technical Field

The present invention relates to a safety apparatus of a battery module for a vehicle, and more particularly, to a technology associated with a safety apparatus of a battery module for a vehicle that can maintain stability by opening a circuit to prevent electricity from flowing when a battery cell is expanded by abnormal phenomena (e.g., overcharge, overdischarge, internal short-circuit, substantially high temperature, and the like).

(b) Background Art

A hybrid electric vehicle, a fuel battery vehicle, and an electric vehicle are configured to drive a vehicle by using an electric motor and require a high-voltage battery pack that provides driving power to the electric motor.

The high-voltage battery pack uses a lithium ion rechargeable battery which is considered a next-generation energy storage and generally the lithium ion rechargeable battery type for the vehicle includes varies according to manufacturer, but generally a can type and a pouch type are used, and includes a module and a packet based on the number and shapes of cells which are determined by each manufacturer.

For example, eight battery cells are connected in series to constitute one battery module (e.g., CMA, cell module assemble), and nine battery modules (CMA), one battery management system (BMS), and one power relay assembly (PRA) are combined to constitute one battery pack (BMA, battery module assemble).

A technology that maintains durability and safety is applied to the lithium ion rechargeable battery and a safety device that induces electric short-circuit when an abnormal phenomenon occurs is used to maintain vehicle safety. In other words, parts used as safety elements in the related art include a positive temperature coefficient (PTC), a thermal fuse, a bi-metal with PTC, and the like, and the PTC is an element that has resistance that increases when a temperature increases. The resistance of the PTC also increases under an operating temperature to decrease charge/discharge efficiency and when high current is conducted, voltage drop causes reduction of battery utility zone and further, when the PTC is exposed to moisture, high temperature, and the like, reliability deteriorates. Therefore, the PTC may be unsuitable for a vehicle which is used for 10 years or more.

In addition, the thermal fuse is an element wherein an internal circuit is fused by heat when the temperature of the thermal fuse increases. The thermal fuse has a lower resistance than the PTC and has an increased operating capability when the high current is generated due to short circuit, and the like, but may be fused by heat generated in the cell when overcharged with low current. However, the temperature does not increase up to a fuse temperature due to limitations such as an installation position, and the like and when an element operating at a low temperature is used, the operating capability may decreased due to high current generated at the acceleration of the vehicle, and as a result, the thermal fuse may be unsuitable for being used for the vehicle.

Further, the bi-metal with PTC has a higher resistance than that of a general PTC, but the bi-metal with PTC is unsuitable to be used for the vehicle due to malfunctions of bi-metal by vibration and shock.

The description provided above as a related art of the present invention is just for helping understanding the background of the present invention and should not be construed as being included in the related art known by those skilled in the art.

SUMMARY

The present invention provides a safety apparatus of a battery module for a vehicle that may prevent a battery cell from being charged or discharged by opening a circuit to prevent electricity from flowing when a battery cell is expanded to maintain stability, by considering a phenomenon in which the battery cell is expanded when abnormal phenomena occur in the battery cell due to overcharge, overdischarge, internal short-circuit, substantially high temperature, and the like.

In one embodiment, a safety apparatus of a battery module for a vehicle may include: cell terminals consisting in battery cells disposed in a row; and a safety bus bar which electrically connects two cell terminals disposed at a diagonal in two battery cells adjacent to each other among the cellS, and may be configured to maintain an electrical connection state when the battery cell is in normal state (e.g., the battery cell is not expanded) and perform an operation of opening a circuit to prevent electricity from flowing when an abnormal situation in which at least one battery cell among the battery cells is expanded occurs.

The safety bus bar may include: a stator fixed by being penetrated by the cell terminal and mixed with a conductor and a nonconductor; a rotor penetrated by the cell terminal to be in contact with the stator and may be installed rotatably around the cell terminal, and disposed by being mixed with a conductor and a nonconductor; and a connection bar electrically connecting the conductor of the rotor.

The safety bus bar may further include a fixation pin installed integrally through a side surface of the stator and the cell terminal to fix the stator to the cell terminal. The safety bus bar may further include a rotor cap detachably coupled to the cell terminal to prevent the rotor from being removed from the cell terminal. The bus bar may further an insulating member installed between the rotor and the rotor cap. The cell terminal and the rotor cap may be detachably coupled to each other in bolt and nut system.

The conductor and the nonconductor may be disposed on the top of the stator, and in particular the conductor and the nonconductor may be alternately disposed radially on the top of the stator in a circumferential direction. An internal conductor which may be electrically connected with the conductor disposed on the top of the stator may be further disposed on an inner circumferential surface of the stator. The conductor and the nonconductor may be alternately disposed radially on a bottom of the rotor in a circumferential direction. An internal nonconductor may be further disposed on an inner circumferential surface of the rotor for electrical short-circuit with the cell terminal.

The conductor of the stator and the conductor of the rotor may be installed in connection with each other in normal state in which the battery cell is not expanded, and the rotor may be configured to rotate under abnormal situation when the battery cell is expanded, and as a result, the conductor of the stator and the nonconductor of the rotor may contact each other and the nonconductor of the stator and the conductor of the rotor may be in contact with each other to open a circuit to prevent electricity from flowing therethrough.

BRIEF DESCRIPTION OF THE DRAWINGS

The above and other features of the present invention will now be described in detail with reference to exemplary embodiments thereof illustrated the accompanying drawings which are given hereinbelow by way of illustration only, and thus are not limitative of the present invention, and wherein.

Figure 1:
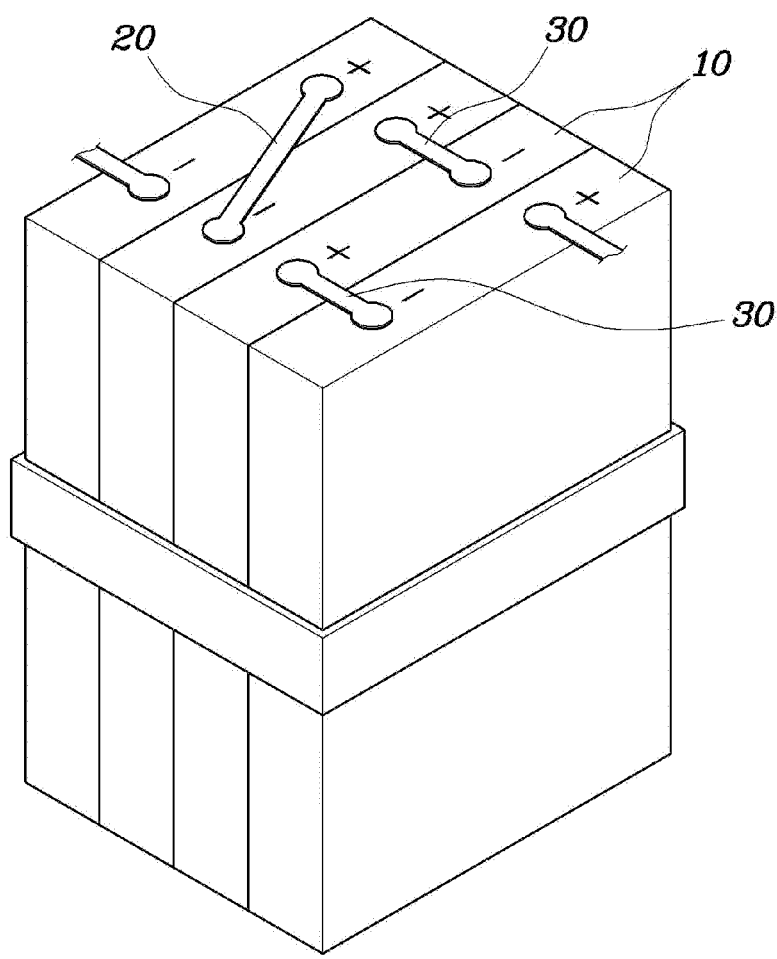
FIG. 1 is an exemplary view of a battery module for a vehicle in which a safety bus bar is installed according to an exemplary embodiment of the present invention.
Figure 2:
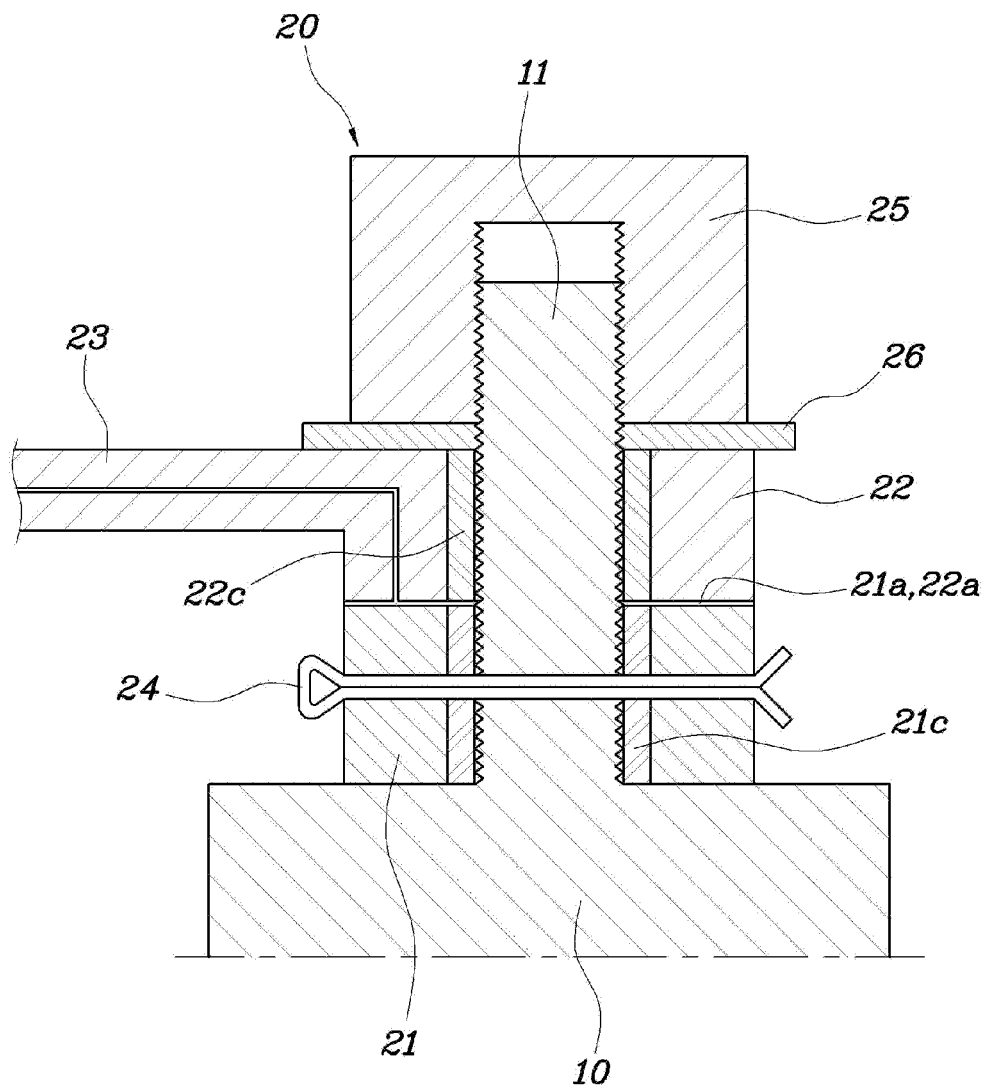
FIG. 2 is an exemplary cross-sectional view illustrating an installation structure of the safety bus bar according to an exemplary embodiment of the present invention.
Figure 3:
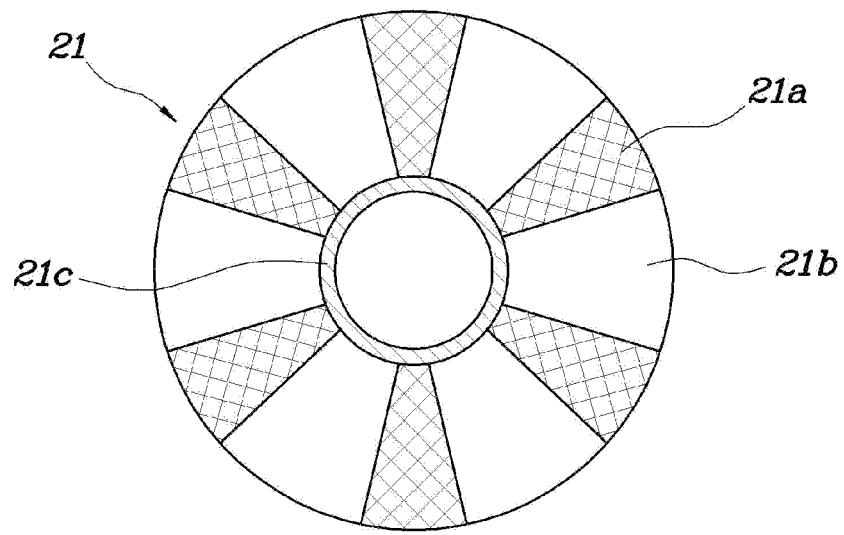
FIGS. 3 to 4 are exemplary diagrams for describing a stator and a rotor according to an exemplary embodiment of the present invention.
Figure 4:
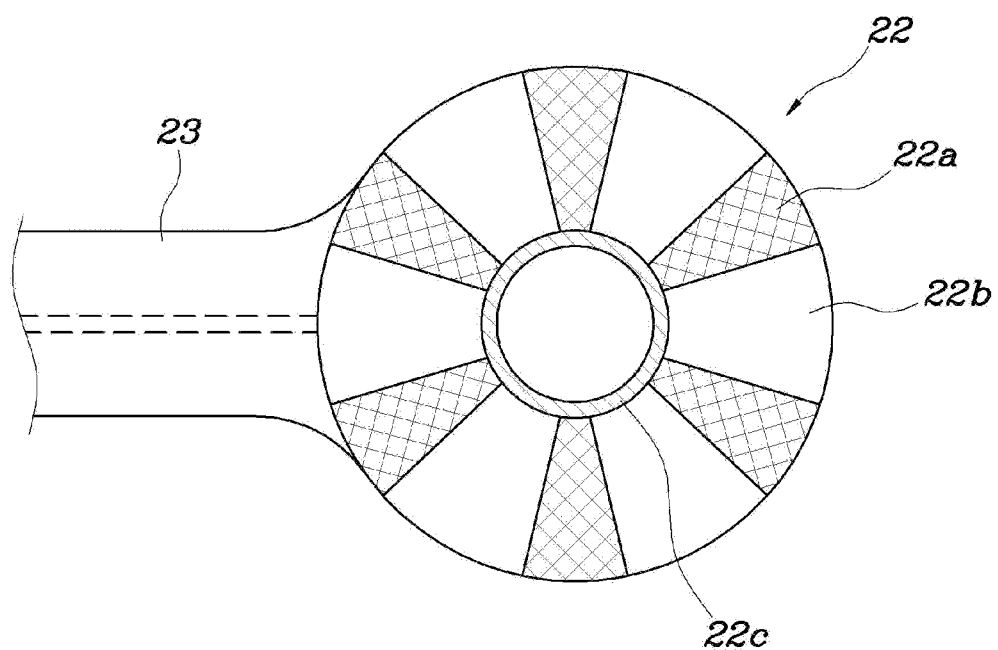

It should be understood that the accompanying drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

A safety apparatus of a battery module for a vehicle may include: cell terminals 11 consisting in battery cells 10 disposed in a row; and a safety bus bar 20 configured to electrically connect two cell terminals disposed diagonally in two battery cells adjacent to each other among the battery cells 10, and may be configured to maintain an electrical connection state when the battery cells 10 are in normal state (e.g., the battery cell is not expanded) and open a circuit to prevent electricity from flowing when an abnormal situation in which at least one battery cell among the battery cells 10 is expanded occurs, as illustrated in FIGS. 1 to 4.

The battery module may consist of battery cells 10 disposed in a row and the safety bus bar 20 may connect two cell terminals disposed at a diagonal in two battery cells adjacent to each other among the battery cells 10. The cell terminals may correspond to anode terminals and cathode terminals of the battery cells.

Moreover, in FIG. 1, an anode terminal and a cathode terminal of the battery cell 10 not disposed diagonally may be electrically connected using an existing bus bar 30.

The safety bus bar 20 may include: a stator 21 fixed by being penetrated by the cell terminal 11 and mixed with a conductor 21a and a nonconductor 21b; a rotor 22 penetrated by the cell terminal 11 to be in contact with the stator 21 and installed rotatably around the cell terminal 11, and disposed by being mixed with a conductor 22a and a nonconductor 22b; and a connection bar 23 electrically connecting the conductor 22a of the rotor 22.

Additionally, the safety bus bar 20 may further include: a fixation pin 24 installed integrally through a side surface of the stator 21 and the cell terminal 11 to fix the stator 21 to the cell terminal 11; a rotor cap 25 detachably coupled to the cell terminal 11 to prevent the rotor 22 from being removed from the cell terminal 11; and an insulating member 26 installed between the rotor 22 and the rotor cap 25.

The cell terminal 11 may have a bolt shape and the rotor cap 25 may have a nut shape, therefore the cell terminal 11 and the rotor cap 25 may be detachably coupled to each other in bolt and nut system. The insulating member 26 may be configured to provide electric insulation and reduce friction between the rotor 22 and the rotor cap 25.

A conductor 21a and a nonconductor 21b disposed within the stator 21 may be disposed on a top of the stator 21. In particular, the conductor 21a and the nonconductor 21b may be alternately disposed in a circumferential direction while being formed radially on the top of the stator 21. The conductor 22a and the nonconductor 22b disposed within the rotor 22 may be disposed on a bottom of the rotor 22, and the conductor 22a and the nonconductor 22b may be alternately disposed in a circumferential direction while being formed radially on the bottom of the rotor 22.

Moreover, an internal conductor 21c may be electrically connected with the conductor 21a disposed on the top of the stator 21 and may be disposed on an inner circumferential surface of the stator 21. The internal conductor 21c may be configured to improve electrical connectivity between the cell terminal 11 and the conductor 21a of the stator 21. In addition, an internal conductor 22c may be disposed on an inner circumferential surface of the rotor 22 for electrical short-circuit with the cell terminal 11.

Herein, an operation of the embodiment of the present invention will be described.

A battery module constituting a high-voltage battery pack for a vehicle may include a plurality of battery cells 10 electrically connected through a safety bus bar 20 and a common bus bar 30. In other words, the rotor 22 may not rotate around the cell terminal 11 in normal state in which the battery cell 10 is not expanded, and as a result, the conductor 21*a* of the stator 21 and the conductor 22*a* of the rotor 22 may be electrically connected to allow the battery module to perform charging and discharging operations. In addition, when abnormal phenomena occur in the battery cell 10 due to overcharge, overdischarge, internal short circuit, substantially high temperature, and the like, the battery cell 10 may be expanded, and as a result, an outer shape of the battery cell 10 may inflate.

When the battery cell 10 is expanded as described above, the rotor 22 including the safety bus bar 20 may be configured to rotate clockwise or counterclockwise centering on the cell terminal 11, and thus, the conductor 21*a* of the stator 21 and the nonconductor 22*b* of the rotor 22 may contact each other and the nonconductor 21*b* of the stator 21 and the conductor 22*a* of the rotor 22 may contact each other, causing a circuit to open to prevent electricity from flowing in the stator 21 and the rotor 22.

When the circuit is opened to prevent electricity from flowing in the stator 21 and the rotor 22 as described above, the battery cell 10 may not be charged or discharged and as a result, stability may be maintained.

As described above, according to the exemplary embodiment of the present invention, when the battery cell 10 is expanded due to the abnormal phenomena, the circuit may be opened to prevent electricity from flowing by cutting off electrical connection between the battery cells 10 by rotation of the rotor 22 including the safety bus bar 20 and thus the battery cell 10 may not be charged and discharged, and as a result, the stability may be maintained.

Further, the elements of the apparatus may have substantially low resistance and may not be influenced by external factors such as temperature, humidity, vibration, and the like, and as a result, the probability of malfunction decreases and electric short circuit between the battery cells 10 may be induced by rotation torque of the rotor 22, and as a result, substantially accurate operation may be maintained.

Additionally, in the present invention, an operating timing may be adjusted by adjusting a ratio between the conductor and the nonconductor of the stator 21 and the rotor 22 and in particular, sensors such as a temperature sensor, a voltage sensor, and the like may be installed between the stator 21 and the insulating member 26, and as a result, additional arrangement of spaces and mechanisms for installing the sensors may be eliminated.

The invention has been described in detail with reference to exemplary embodiments thereof. However, it will be appreciated by those skilled in the art that changes may be made in these embodiments without departing from the principles and spirit of the invention, the scope of which is defined in the accompanying claims and their equivalents.

What is claimed is:

1. A safety apparatus of a battery module for a vehicle, comprising:
    cell terminals consisting in battery cells disposed in a row; and
    a safety bus bar configured to electrically connect two cell terminals disposed diagonally in two battery cells adjacent to each other among the battery cells, and maintain the electrical connection when the battery cells are not expanded and open a circuit to prevent electricity from flowing when at least one battery cell among the battery cells is expanded,
    wherein the safety bus bar includes:
        a stator fixed by being penetrated by a corresponding cell terminal among the cell terminals and mixed with a conductor and a nonconductor of the stator,
        a rotor penetrated by another corresponding cell terminal among the cell terminals to be in contact with the stator and installed rotatably around the cell terminal, wherein the rotor is disposed by being mixed with a conductor and a nonconductor of the rotor; and
        a connection bar electrically connecting the conductor of the rotor,
        wherein the rotor is configured to rotate when the battery cells are expanded, to cause the conductor of the stator and the nonconductor of the rotor to contact each other and the nonconductor of the stator and the conductor of the rotor to contact to open a circuit to prevent electricity from flowing in the stator and the rotor.

2. The safety apparatus of a battery module for a vehicle of claim 1, wherein the safety bus bar further includes:
    a fixation pin installed integrally through a side surface of the stator and the corresponding cell terminal to fix the stator to the corresponding cell terminal.

3. The safety apparatus of a battery module for a vehicle of claim 1, wherein the safety bus bar further includes:
    a rotor cap detachably coupled to the corresponding cell terminal to prevent the rotor from being removed from the corresponding cell terminal.

4. The safety apparatus of a battery module for a vehicle of claim 3, wherein the bus bar further includes:
    an insulating member installed between the rotor and the rotor cap.

5. The safety apparatus of a battery module for a vehicle of claim 3, wherein the corresponding cell terminal and the rotor cap are detachably coupled to each other in a bolt and nut system.

6. The safety apparatus of a battery module for a vehicle of claim 1, wherein the conductor and the nonconductor of the stator are alternately disposed radially on a top of the stator in a circumferential direction.

7. The safety apparatus of a battery module for a vehicle of claim 6, further comprising:
    an internal conductor electrically connected with the conductor of the stator and disposed on an inner circumferential surface of the stator.

8. The safety apparatus of a battery module for a vehicle of claim 1, wherein the conductor and the nonconductor of the rotor are alternately disposed radially on a bottom of the rotor in a circumferential direction.

9. The safety apparatus of a battery module for a vehicle of claim 8, further comprising:
    an internal nonconductor disposed on an inner circumferential surface of the rotor for electrical short-circuit with the corresponding cell terminal.

10. The safety apparatus of a battery module for a vehicle of claim 1, wherein the conductor of the stator and the conductor of the rotor are installed in connection with each other when the battery cell is not expanded.

* * * * *